Aug. 25, 1953
J. B. THOMPSON
2,649,672
METHOD OF WRAPPING IN MULTI-PLY MATERIAL
Filed May 19, 1950
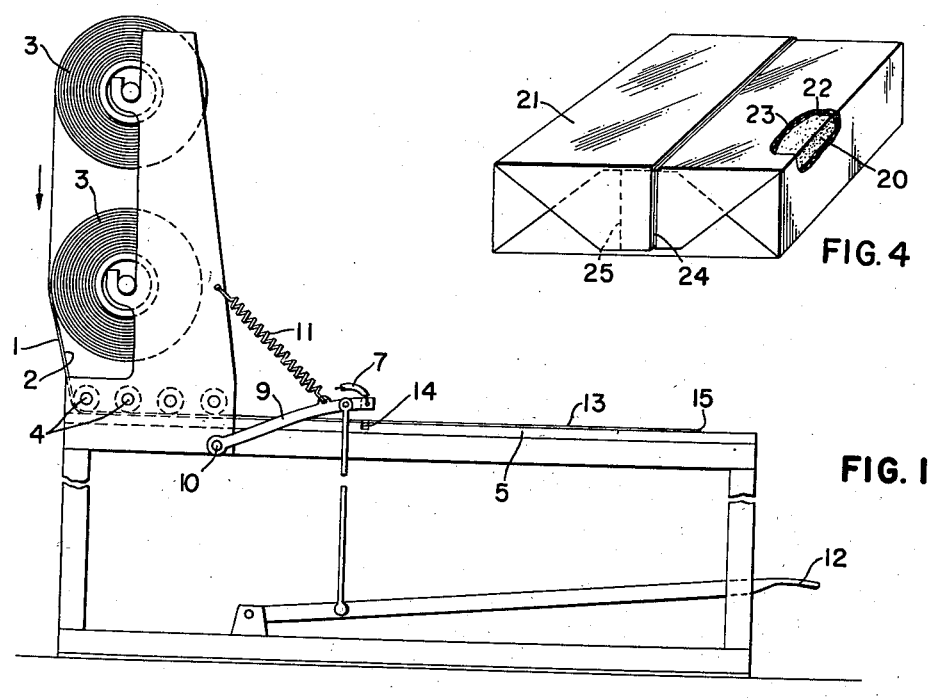
FIG. 4
FIG. 1
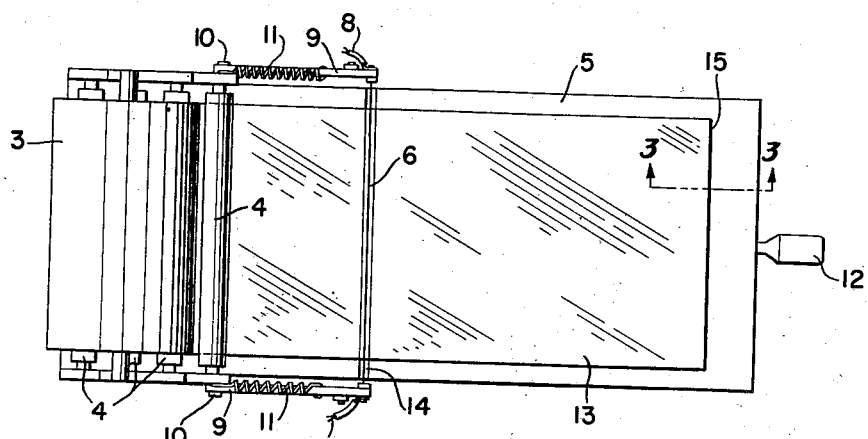
FIG. 2
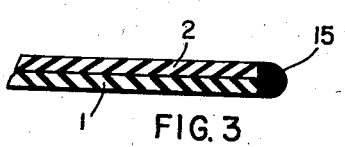
FIG. 3
*INVENTOR.*
JOSEPH B. THOMPSON
BY
*R. L. Miller*
ATTORNEY Patented Aug. 25, 1953

2,649,672

UNITED STATES PATENT OFFICE 2,649,672

METHOD OF WRAPPING IN MULTI-PLY MATERIAL

Joseph B. Thompson, Toronto, Ontario, Canada, assignor to Wingfoot Corporation, Akron, Ohio, a corporation of Delaware Application May 19, 1950, Serial No. 162,849

1 Claim. (Cl. 53—8)

This invention relates to a new method of wrapping in multi-ply material. The wrapper includes two or more plies of heat-sealable material which are united only at two opposite edges. The union of the materials along these edges is effected by a heated element, and preferably simultaneously with severing the finished wrapper from long sheets of the individual films used in its manufacture. The severing and sealing of films is preferably accomplished by a heated wire in a manner to be more fully explained in what follows.

In many packaging operations it is desirable to use two plies of wrapping material. Ordinarily the two plies will have different properties, although this is not essential. In the wrapping of foodstuffs with rubber hydrochloride film, for example, it is necessary that the film used next to the foodstuff be free from taste-imparting plasticizer, and such film may be used together with an outer wrapper which includes such a plasticizer to give strength to the film. Other illustrations of the use of two wrapping materials will suggest themselves to those skilled in the art.

According to this invention the two or more plies of heat-sealable film required for the wrapping operation are united at opposite ends to form a single wrapper. An article can be wrapped more quickly, and therefore more cheaply, with this multi-ply wrapper, than with two separate wrappers.

The invention will be described more particularly in connection with the wrapping of cheese with a two-ply wrapper formed of films which do not cling to the cheese. The formation of mold is prevented by holding the wrapper in contact with the surface of the cheese. This excludes the air. Green cheddar cheese may be cured while packaged in this manner, and cured cheddar cheese may be shipped and stored while packaged in this manner. Such packaging is called in the trade "pressure packaging." In order to exclude the air and prevent formation of mold on the surface of the rindless cheese, it is necessary to have a very thin film next to the cheese. This is covered with an outer wrapper which protects the inner wrapper. In pressure packaging the wrapped cheese is subjected to pressure in the package, and it is maintained under pressure throughout the whole period it is in the package. By pressing the wrapper to the surface of the cheese the air is excluded. This eliminates all possibility of mold forming between the wrapper and the cheese.

Rubber hydrochloride film is produced by casting a solution of the film material on a belt of suitable composition and then evaporating the solvent. Such film cannot be produced commercially in gauges less than about .0008 inch because of the difficulty of removing the heated film from the belt or other casting surface. Film of this thickness is so stiff that if it is applied directly to cheese which is to be pressure packaged, it does not conform to the shape of the cheese, but when it is folded over a square-cut corner of the cheese it sticks out from the cheese on one or both sides of the corner. Air collects in spaces where the film does not cling to the cheese and mold develops. To prevent the formation of mold, it is necessary that the film be held in flat contact with all surfaces of the cheese so that the air does not come into contact with the cheese. This is only possible with films thinner than .0008 inch which are sufficiently flexible to be folded flat against the cheese on both sides of the corners. Such thinner films are made by stretching thicker films, and rubber hydrochloride film stretched to a thickness of about .0004 inch has been very satisfactory for this purpose. Cheese first wrapped in this thin film and then over-wrapped in rubber hydrochloride film about .0008 to .001 inch thick can be pressure-packaged satisfactorily.

The preferred wrapper of this invention has been developed particularly for pressure packaging cheese and it is made of one ply of thin rubber hydrochloride film and a heavier ply of rubber hydrochloride or other plastic which protects the inner ply.

The production of the multi-ply wrapper will be further explained in connection with the accompanying drawings.

Fig. 1 is a side elevation of equipment which may be used in producing the multi-ply wrapper of this invention;

Fig. 2 is a plan view;

Fig. 3 is a section through the finished wrapper; and

Fig. 4 shows in perspective cheese or other article wrapped in the two-ply film of this invention, part of the wrapper being broken away.

The films 1 and 2 are withdrawn from the rolls 3. They are brought under the guide rollers 4, of which four are shown, although any suitable number may be employed. Usual brake means for preventing the rolls 3 from turning too freely may be provided.

The two films are drawn out flat on the working table 5, the film 2 being above the film 1. These films are of the same width, but this is not essential. The film 1 is rubber hydrochloride film .0004 inch thick and the film 2 is substantially thicker being .0008 to .001 inch, and it is preferably rubber hydrochloride film also.

The Nichrome wire 6 serves the double purpose of (1) cutting off the two plies of film to any desired length and (2) simultaneously sealing the cut edges of the films together on both sides of the cut-off. It is maintained at any suitable temperature by passing current through the lead-in wire 7 and out the other wire 8. The temperature of the cut-off wire 6 depends upon its composition, the nature of the current passed through it, etc. For use on rubber hydrochloride film a wire heated to about 200° F. has proved satisfactory. For other heat-sealable films different temperatures will be required.

This wire is held by the arms 9 which are pivoted at 10. The springs 11 tend to hold the hot wire out of contact with the film. The operator steps on the treadle 12 when he wants to bring the heated wire into contact with the films.

Although ordinarily a straight wire will be used for the cut-off, a curved wire or blade, or cut-off of other shape may be used where required.

To operate the apparatus, a desired length 13 of each of the two films is drawn off from the rolls 3, under the guide rolls or tension rolls 4, and spread out on the table 5 beyond the notch 14. Then by stepping on the treadle 12 the hot wire 6 is pressed against the films and almost instantaneously melts its way through them and seals the cut edges of the two films together on each side of the cut-off. Fig. 3 is a cross section showing the two films and the seal 15 which unites the ends of the two films. For ease of illustration the films are shown of the same thickness. Each time the treadle is operated the hot wire seals the cut ends of the films on both sides of the wire. One seal is made at the forward end of the two films 1 and 2 which projects above the notch 14, and simultaneously the ends of the cut lengths 13 of the films which project above the notch 14 are sealed together with a similar seal. The rolls 4 hold the films in position, while the operator uses the cut wrapper for packaging, or any other purpose. Then the two sheets 1 and 2, with their forward ends sealed together are again drawn out onto the table the required distance and the operation repeated.

Figure 4 shows cheddar cheese or other article 20, wrapped in the two-ply wrapper 21. The inner ply 22 is thinner than the outer ply 23. Opposite edges 24 and 25 of the wrapper are sealed together.

The equipment and process are applicable to the manufacture of wrappers from two or more films of the same or different heat-sealable compositions such as rubber hydrochloride film, vinyl films, polyethylene film, vinyl chloride-vinylidene chloride film, etc. The two plies may be of different heat-sealable compositions or they may be generally of the same composition and of different thickness or they may include different ingredients, such as plasticizers, etc. The films which are united to form the wrapper may be of exactly the same composition and the same thickness.

Although generally both films will be of the same width, with their side edges coinciding, this is not necessary. For instance, when a thinner and a thicker film are used, it may be desirable to have the thinner film somewhat narrow than the thicker film and to have its edges spaced inwardly from the edges of the thicker film. Various wrappers using films of the same or different width, with at least one edge of the two films not coinciding, will suggest themselves to the person skilled in the art.

In a modification of the invention, only one edge of the plies of the wrapper will be united. This may be done by cutting the films 1 and 2 along a line somewhere between the seal 15 and the notch 14 (Fig. 1). It is preferably done by attaching a cold knife blade to the arms 9 alongside the wire 6 so that when the films are sealed together they will be cut close to the seal.

The rolls 3 may be mounted one above the other as shown in the drawing or they may be placed side by side, or in any other suitable position. Ordinarily the axles of the two rolls will be parallel, although this is not essential. Modifications may be made in the apparatus and process, and films of any desired number of plies and of suitable heat-sealable composition may be utilized.

What I claim is:

The method of wrapping which includes the steps of partially unrolling two films of rubber hydrochloride with their side edges coinciding, one of the films being thinner than the other, bringing the films into face-to-face contact, simultaneously cutting across both films, unrolling the same length of film from both rolls and again simultaneously cutting across both films, and thermally uniting the films at both cuts simultaneously with the cutting operations, placing the article to be wrapped in contact with the thinner of the two plies, and then wrapping the article in the two-ply sheet.

JOSEPH B. THOMPSON.

References Cited in the file of this patent

UNITED STATES PATENTS

| Number | Name | Date |
| --- | --- | --- |
| 1,661,479 | Josephson | Mar. 6, 1928 |
| 1,818,923 | Taylor | Aug. 11, 1931 |
| 2,167,634 | Calvert | Aug. 1, 1939 |
| 2,232,640 | Schwartzman | Feb. 18, 1941 |
| 2,274,344 | Palmer | Feb. 24, 1942 |
| 2,430,496 | Dodge | Nov. 11, 1947 |
| 2,432,752 | Gray | Dec. 16, 1947 |
| 2,466,387 | Curtis | Apr. 5, 1949 |
| 2,510,383 | Dalgleish | June 6, 1950 |
| 2,519,330 | Evans et al. | Aug. 15, 1950 |
| 2,552,353 | Troth et al. | May 8, 1951 |